United States Patent [19]

Becker et al.

[11] 4,138,676
[45] Feb. 6, 1979

[54] METHOD AND DEVICE FOR INCREASING THE SECURITY AGAINST TRANSMISSION ERRORS IN AN INFORMATION TRANSMISSION SYSTEM

[75] Inventors: Friedbert Becker; Wilhelm Grafinger, both of Munich; Bernhard Hildebrandt, Hochbrück, all of Fed. Rep. of Germany

[73] Assignee: Siemens Aktiengesellschaft, Berlin & Munich, Fed. Rep. of Germany

[21] Appl. No.: 776,765

[22] Filed: Mar. 11, 1977

[30] Foreign Application Priority Data

Mar. 26, 1976 [DE] Fed. Rep. of Germany ....... 2612967

[51] Int. Cl.² ................................................ G01S 9/56
[52] U.S. Cl. ........................... 343/6.5 R; 343/6.5 LC
[58] Field of Search .......... 343/6.5 R, 6.5 LC, 6.5 SS

[56] References Cited

U.S. PATENT DOCUMENTS

| 3,863,244 | 1/1975 | Lichtblau | 343/6.5 SS |
| 3,969,725 | 7/1976 | Couvillon et al. | 343/6.5 R |
| 4,037,227 | 7/1977 | Kline | 343/6.5 R |

*Primary Examiner*—S. C. Buczinski

*Attorney, Agent, or Firm*—Hill, Gross, Simpson, Van Santen, Steadman, Chiara & Simpson

[57] ABSTRACT

A method and device for increasing security with respect to transmission faults in an information-transmission system, particularly for the railroad field, in which an interrogation device and a passive response device are movable relative to one another, and the interrogation device transmits an interrogation signal, which can be periodically swept through a predetermined frequency band, preferably in the microwave range, and which during a read operation, receives during several periods from the passive response device, a frequency-selectively reflected interrogation signal, in accordance with a k-digit information item to be transmitted, which signal forms the response signal, with the response signals being suitably identified and one of a series thereof, preferably that with the least errors therein, being suitably through-connected for subsequent utilization, in which not only is the response signal with the fewest errors utilized, but of the signals having the same minimum number of errors, that response signal which had the highest input signal strength at the time of receipt of the interrogation device.

2 Claims, 6 Drawing Figures

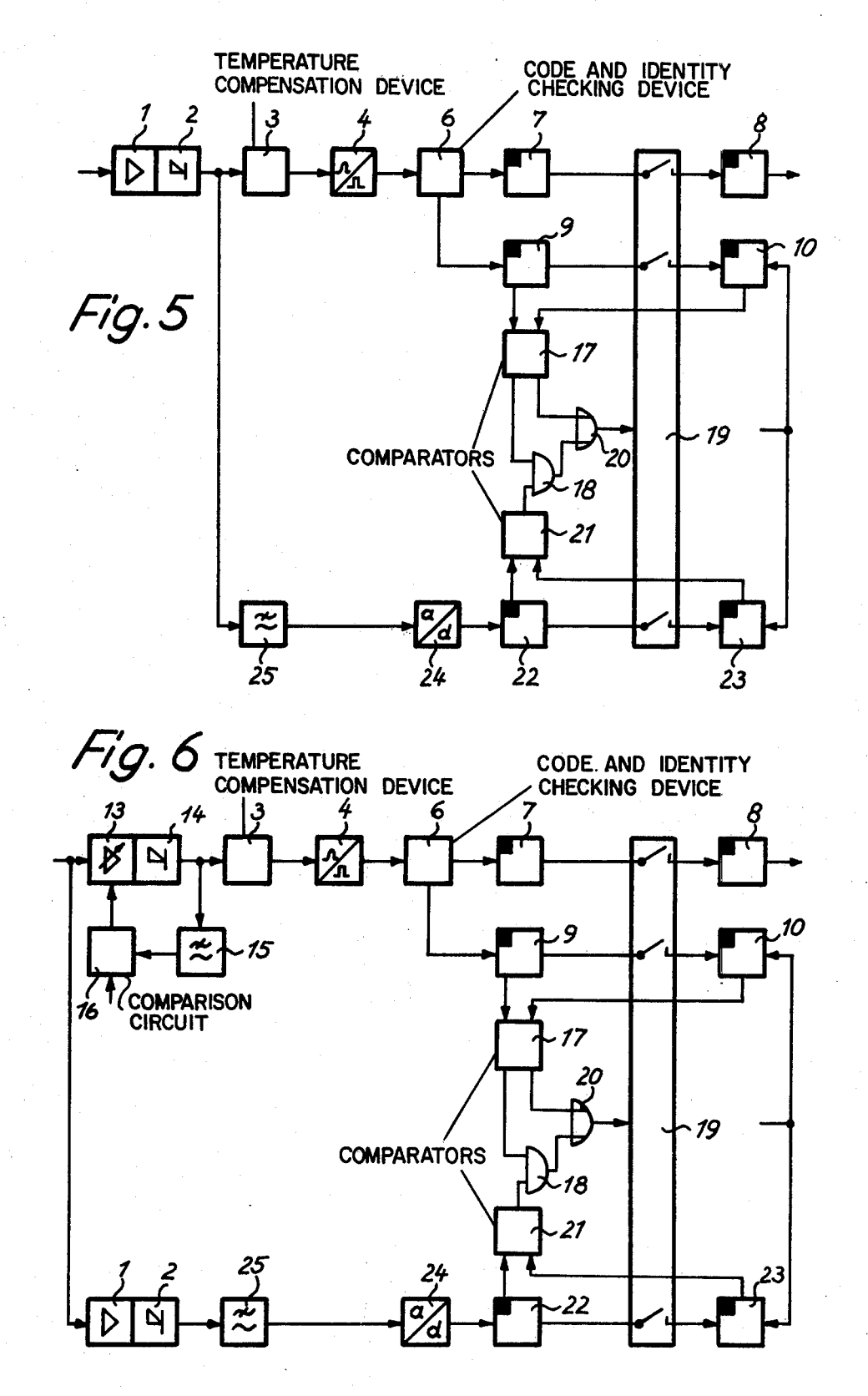

TEMPERATURE COMPENSATION DEVICE

CODE AND IDENTITY CHECKING DEVICE

COMPARATORS

Fig. 6

TEMPERATURE COMPENSATION DEVICE

CODE AND IDENTITY CHECKING DEVICE

COMPARISON CIRCUIT

COMPARATORS

METHOD AND DEVICE FOR INCREASING THE SECURITY AGAINST TRANSMISSION ERRORS IN AN INFORMATION TRANSMISSION SYSTEM

BACKGROUND OF THE INVENTION

The invention relates to a method and device for increasing security with respect to transmission faults in an information-transmission system, particularly for the railroad field, in which an interrogation device and a passive response device are movable relative to one another, and the interrogation device transmits an interrogation signal, which can be periodically swept through a predetermined frequency band, preferably in the microwave range, and which during a read operation, receives during several periods from the passive response device, a frequency-selectively reflected interrogation signal, in accordance with a k-digit information item to be transmitted, which signal forms the response signal. The interrogation device is equipped with a code and/or identity checking device which assigns a corresponding error designation or code identification mark or value to the respective information transmitted in each period of the inquiry signal, and is provided with a switching device which relays the information with the smallest error designation to following evaluation devices.

This type of microwave transmission system for sequential or successive information transmission between a passive response device and an active inquiry device is described, for example, in the publication "aci-report 8" of the Siemens Company. The system can be utilized for transmission of car or vehicle data to a stationary line or track installation, or line or track data to a car or vehicle in dependence upon the disposition of the interrogation and the cooperable passive devices.

As a result of the high reading speed of the interrogation device, each response device repeatedly transmits its information, in coded form, a number of times. Consequently, it is possible by means of suitable code and identity checking devices to select that information item of those transmitted during a read operation, with the fewest errors. Selection thereof, can be accomplished with a device such as illustrated in German Pat. No. 2,101,105, as a result of which a substantial increase in the transmission security of this system can be achieved. Such known checking device has the characteristic, in a read operation, of evaluating as "correct" information which it has recognized as identical to prior information, with such information then being through connected for transmission by the response device to further processing devices, independently of whether additional following code correct and identical pieces of information are determined during such a read operation.

It will be appreciated that during the reflection from a response device, the reflected signal of the interrogation device, representing the response signal for the inquiry device, will appear as a useful signal in the receiving branch of the interrogation device, and such useful signal will rise above a noise level occasioned, for example, by interfering signals, such as interfering reflections, with the response signal increasing to a maximum value and then diminishing. Falsification in such a response signal which cannot be recognized by the code and identity checking device most probably occurs in a transition range in which the interference signal level and the useful signal level are of about equal magnitude.

However, if this type of falsified information has once been evaluated as "correct", in a device such as that illustrated in German Pat. No. 2,101,105, such information is undesirably through-connected independently of whether true and correct information occurs during the remainder of the read operation involved.

BRIEF SUMMARY OF THE INVENTION

The invention therefore has among its objects the production of a device which increases security with respect to transmission errors in the designated transmission range.

This objective is achieved in a device in accordance with the invention, in which the interrogation device determines from the received signal comprising the response signal and incident interference signals, by means of detector mechanism, the level of low-frequency portions lying below the frequency of the periodic interrogation sweep, with means being provided for triggering the cooperable switching device when there are equivalent error designations of several pieces of transmitted information of a read operation which in each case through-connects the information having the higher signal level of the low-frequency portions thereof.

BRIEF DESCRIPTION OF THE DRAWINGS

In the drawings wherein like reference characters indicate like or corresponding parts:

FIG. 5 is an examplary schematic circuit of an embodiment of the invention utilizing an unregulated input circuit; and FIG. 6 is a circuit similar to FIG. 5 illustrating the use of a regulated input circuit.

DETAILED DESCRIPTION OF THE INVENTION

Figure 1:
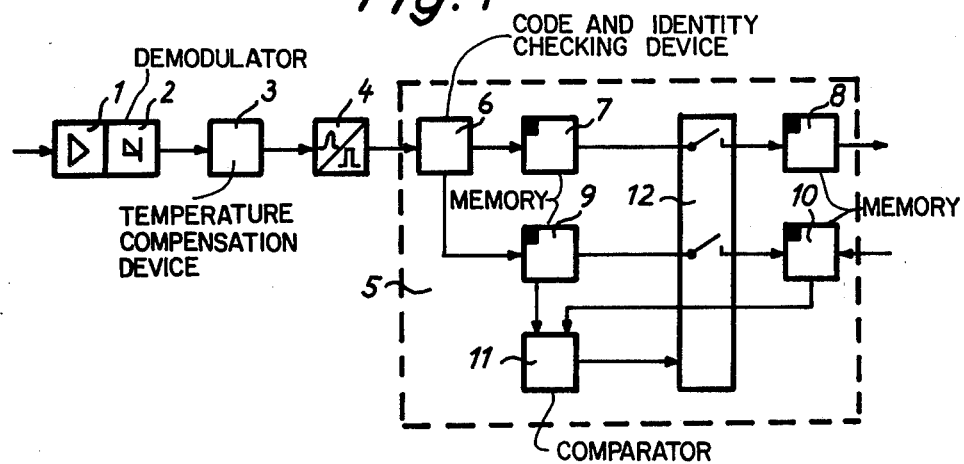
FIG. 1 is a schematic diagram of the receiving branch of an interrogation device of the prior art.

Referring to FIG. 1, which illustrates the schematic circuit of the receiving branch of an interrogation device of known type such as described in the previously referred to aci-report 8. In such a circuit, the received reflected signal from the interrogation device is conducted from an antenna, which for simplicity is not illustrated, to an amplifier 1 having a constant amplification and is subsequently conducted to a demodulator 2, with the latter and the amplifier 1 thus constituting an unregulated input circuit. The amplified and demodulated signal is conducted to a temperature compensation device 3 which, for example, can be constructed in accordance with German Pat. No. 1,591,595, causing a slight time delay for the signal which, however, is of negligible importance insofar as the functioning of the present invention is concerned. The signal is then conducted over a pulse-shaper stage 4 to a device indicated generally by the reference numeral 5, which is operative to select the information with the fewest errors from a plurality of a successive transmissions of the same k-digit information, which device likewise is known from German Pat. No. 2,101,105.

In general, the device 5 comprises a code and identity checking device 6 which assigns an error designation or identification mark or value to each piece of information, indicating how many of the digits of the particular information obviously are incorrect as a result of such checking indicates, and further includes memories 7, 8, 9 and 10, a comparator 11 and a transfer switch 12. Prior to the beginning of each read operation, a limiting value is entered into the store 10 which value indicates or represents the number of digits of the k-digit information which may, as a maximum, be falsified, without preventing any further processing of the information.

At the beginning of a read operation, upon the first k-digit information being received at the code and identity checking device 6, the latter will effect a check thereof with respect to the number of falsified digits, and passes the information thereof into the memory 7, simultaneously entering an error designation mark or value into the memory 9. A comparator 11 receives the error value from the memory 9 and the initial limiting value from the memory 10 and makes a comparison therebetween. If the error designation or value from the memory 9 is smaller than the limiting value from the memory 10 the transfer switch 12 is actuated over an output line of the comparator 11 whereby the content of the memory 7 passes into memory 8 and content of memory 9 passes into memory 10. Thus, each time during a read operation the information has an error designation value which is smaller than the currently stored value in the memory 10, such information passes into memory 8 and its associated error designation value is passed into memory 10. Consequently, at the end of a read operation, the transmitted information in memory 8 is that which was first to be transmitted with the smallest error designation value during the corresponding read operation. Such information can then be obtained from such memory by subsequently connected evaluation devices.

Figure 2:
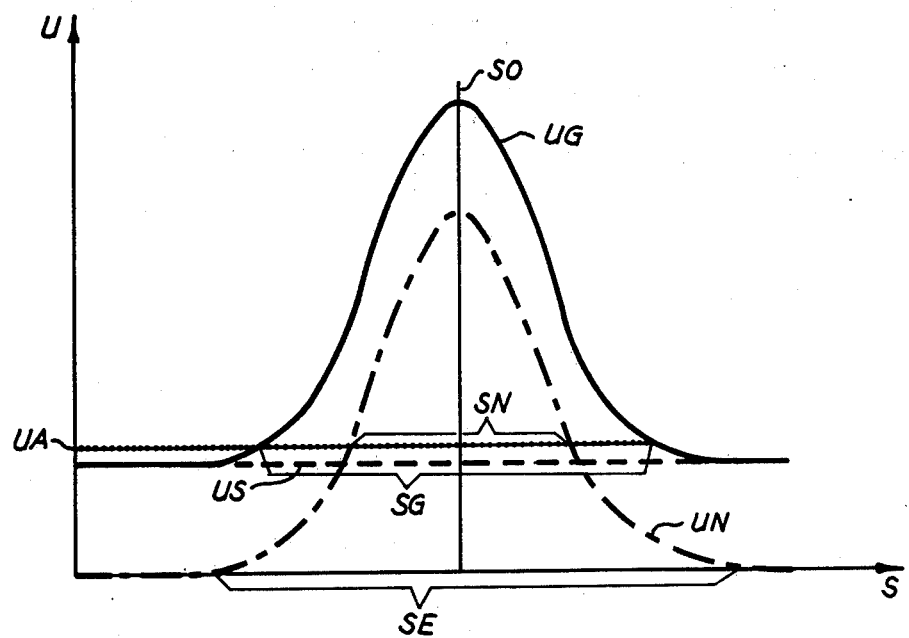
FIG. 2 is a chart illustrating the level of the output signal of an unregulated input circuit in the receiving branch of an interrogation device during reception from a response device.

The mode of operation of the device illustrated in FIG. 1 may be explained in connection with FIG. 2 which illustrates how the level of the output signal of the unregulated input circuit, according to FIG. 1, changes in dependence on the received signal, during the reception of a signal from a response device. In FIG. 2 the reference letter S designates the lateral displacement or shift of the interrogation and response devices with the point SO designating the position at which the interrogation and response devices are directly opposite one another, without lateral displacement.

Curve UN illustrates the signal level curve of the response signal functioning as the useful level, the signal illustrated being that following the amplification by the amplifier 1. Such useful level UN rises in the influence range SE of the response device. It is assumed in FIG. 2 that a constant noise level US exists which is conditional on interference signals also amplified by the amplifier 1, with the sum of the useful level UN and noise level US being represented by the curve UG as the total level and which thus may be considered as the amplified level of the reception signal of the interrogation device.

Figure 3:
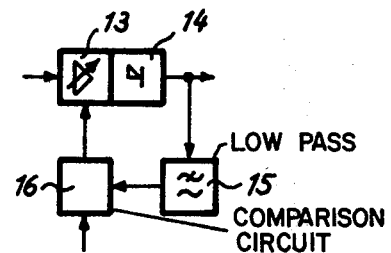
FIG. 3 is a schematic circuit of a regulated input circuit for a reception branch, in accordance with the prior art.

In order to avoid any influence of the noise level US on the signal evaluation, a response level threshold UA is selected for the pulse-shaper stage 4, whereby the total level UG then exceeds the response level threshold UA in a maximum response range SG or, with a complete subsiding of the noise level, in a response range SN. Since the number of information transmissions during a read operation depends directly on the width of the response range, obviously it is desirable to set the response threshold UA as low as possible. However, as a result thereof, the signal-to-noise ratio with respect to the noise level US undesirably decreases. Consequently, the dimensioning of the response level threshold UA can be arrived at only in the form of a compromise between the demand for the most frequent possible transmission of information during a read operation, and the demand for the largest possible signal-to-noise ratio. It has been found that a favorable improvement can be achieved in this respect if a regulated input circuit, for example as illustrated in FIG. 3, is substituted for the unregulated input circuit illustrated in FIG. 1.

In the regulated circuit illustrated, the received signal is supplied to an amplifier 13, whose amplification is adjustable. The signal amplified thereby may be demodulated by means of a demodulator 14, which can be similarily constructed to the demodulator 2 of FIG. 1.

The demodulated signal may be conducted, in accordance with FIG. 1, to a temperature compensation mechanism 3, and, in addition, is also conducted to a low pass 15 whose cutoff frequency is below the sweep frequency of the interrogation signal, and which supplies to the output thereof a voltage, representing a regulating variable, which is compared in a comparison circuit 16 with an externally supplied reference direct voltage, which may be considered a command variable. The difference signal so determined may then be supplied to the amplifier 13 whereby the amplification thereof is reduced in proportion to the correcting variable. In view of the selected cutoff frequency of the low pass, it is assured that the modulation of the received signal will not be undesirably affected.

Figure 4:
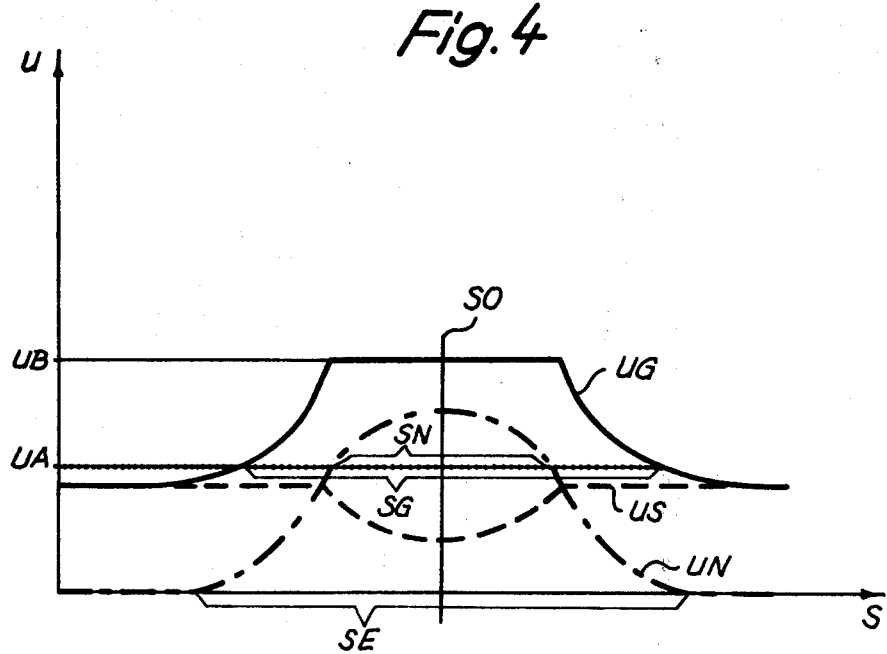
FIG. 4 is a chart similar to FIG. 3 illustrating the level of the output signal of a regulated input circuit such as illustrated in FIG. 3.

FIG. 4 illustrates the course of the level U of the output signal of a regulated input circuit which is disposed in the receiving branch of an interrogation device according to FIG. 1, with the selected designations in FIG. 4 corresponding to those of FIG. 2. In like manner, the response signal, interference signal and, therefore, also the received signal of the regulated and of the unregulated receiving circuits correspond. However, a further factor is depicted in FIG. 4, namely a delimiting threshold UB which is supplied by the reference direct voltage. Thus, the maximum amplification of amplifier 13 which, in the selected example, corresponds to the amplification of amplifier 1, is effective up to such delimiting threshold, and in the event the total level UG of the regulated receiving circuit exceeds a value which, while maintaining the maximum amplification, would make the level U of the output signal exceed the delimiting threshold UB, the amplification of the regulatable amplifier 3 is so reduced that the level U of the output signal is maintained at the value of the delimiting threshold UB. Consequently, as compared with unregulated input circuit, in the regulated input circuit, with an identical response threshold UA, and equally large minimum and maximum response ranges SN or SG, respectively, the signal-to-noise ratio between the response threshold UA and the noise level US increases with the reduction in the amplification of the regulatable amplifier 13.

However, in spite of the advantages of the regulated input is compared with the nonregulated input, FIG. 5 illustrates an examplary embodiment of the invention in which, for the purposes of simplicity, an unregulated input circuit is utilized. Elements 1 to 10 of this circuit are identical to those of FIG. 1, with the comparator 17 substantially corresponding to the comparator 11 of FIG. 1, but in addition thereto, is provided with a second output which supplies a supplemental control signal if the error designation value of memory 9 is identical to the value stored in memory 10, which supplementary control signal is supplied to an input of an AND-member 18.

Actuation of the transfer switch 19, which with the exception of an additional through connection contact corresponds to the transfer switch 12 of FIG. 1, takes place over an OR-member 20 which is actuated, either by a control signal from the comparator 17 representing an error value in the memory 9 smaller than the stored value in memory 10, or the identical value in memory 10 if an additional control signal is present at the second input of the AND-member 18, the output of which is likewise conducted to the OR-member 20.

The additional control signal at the AND-member 18 is triggered by a comparator 21 which compares the contents of two memories 22 and 23. Memory 22 contains a digital value representative of the momentary signal level of the received information, which digital value is obtained from the output signal of the unrelated input circuit over a digital-analog converter 24, which is preceded by a low pass 25.

At the beginning of each operation, memory 23 is simultaneously adjusted with the limiting value for input into the memory 10, comprising a digital value which corresponds to a minimum received signal level to be processed. If following the initiation of read operation, the digital value of memory 22 exceeds that of memory 23, comparator 21 triggers the second control signal to prepare the AND-member 18, and in the event the comparator 17 supplies a supplementary control signal indicating identity between the values stored in the memories 9 and 10, the transfer switch will be actuated over AND-member 18 and the OR-member 20, whereby the memory contents of stores 7 and 9 pass into memories 8 and 10, and additionally the memory content of memory 22 passes into memory 23. Consequently, at the end of a read operation, of all of the received items of information, that appearing in memory 8 will be that information, not only with the smallest error designation value but also that information having the highest received signal level during the particular read operation.

FIG. 6 is similar to FIG. 5 but illustrates the use of a regulated input circuit in place of the unregulated input circuit of FIG. 5, resulting in the additional advantages described in connection with FIG. 4. However, to enable the determination of the absolute value for the level of the received signal over the entire reading range, it is advantageous to connect an unregulated input circuit ahead of the low pass 25, with both the unregulated and regulated input circuits being supplied from the receiving antenna.

It will be appreciated from the above disclosure that the invention is not limited to the specific examples illustrated but may be practiced with component elements of analog type in place of the digital component elements described.

We claim as our invention:

1. In a device, particularly for the railroad field, for increasing security with respect to transmission faults in an information-transmission system, in which an interrogation device and a passive response device are movable relative to one another, and in which the interrogation device transmits an interrogation signal which can be periodically swept through a predetermined frequency band, preferably in the microwave range; the said interrogation device receiving as a response signal, from the passive response device, during a read operation of at least two periods a frequency selectively reflected interrogation signal in accordance with a k-digit information item to be transmitted; the said interrogation device being provided with at least two memories, one of which receives the currently obtained information item, and the other of which receives a previously obtained information item; the said interrogation device being provided with a code and/or identity checking device, which after each period of the response signal assigns an error designation value showing how many of the digits are incorrect; the said code and/or identity checking device being connected with at least two memories, one of which receives the current error designation value, and the other of which receives the lowest previous error designation value; the said interrogation device being provided with a comparator which compares the current and the lowest previous error designation value and closes switching means, which transfers the content of the memory with the currently obtained information item to the memory for the previously obtained information item, if the current error designation value is lower than the lowest previous error designation value, the combination of means for determining the input level of low frequency portions lying below the sweep frequency of the interrogation signal of the response signal; means for comparing the input signal level of the currently received period of the response signal with the input signal level of the previously received period of the response signal, operative to deliver a first signal to said switching means if the input signal level of the currently received period is higher than the input signal level of the previously received signal; said comparator, comparing the current and previous error designation values being operative to deliver a second signal to said switching means if both values are equal; closing of said switching means taking place in the simultaneous presence of both of said first and the second signals.

2. A device according to claim 1, wherein said means for comparing signal levels comprise a pair of memories, one of which receives the input signal level value of a currently received period of the response signal and the other of which receives the highest input signal level value of a previous period of the response signal; an AND-member, at one input of which the output of said level comparing means is supplied, in the event the current input signal has a higher level than highest previous input signal, and at another input of such AND-member is supplied said second signal upon said equality of error designation value; and an OR-member having one input connected to the output of said AND-member and another input connected to receive a third signal from said comparator, if the error designation value of the current period of the response signal is lower than that of a previous period of the response signal, the output of said OR-member being connected to said switching means for actuating the latter in the presence of a signal at such output of the OR-member.

* * * * *